United States Patent
Dubus et al.

(10) Patent No.: US 9,752,701 B2
(45) Date of Patent: Sep. 5, 2017

(54) VALVE OPERATOR ASSEMBLY WITH FREEWHEEL AND AXIAL FRICTION MEANS

(71) Applicant: AKTIEBOLAGET SKF, Gothenburg (SE)

(72) Inventors: Jérôme Dubus, La Riche (FR); Christian Boch, Bassens (FR)

(73) Assignee: AKTIEBOLAGET 3KF, Gothenburg (SE)

( * ) Notice: Subject to any disclaimer, the term of this patent is extended or adjusted under 35 U.S.C. 154(b) by 4 days.

(21) Appl. No.: 15/038,094

(22) PCT Filed: Nov. 21, 2013

(86) PCT No.: PCT/EP2013/074375
§ 371 (c)(1),
(2) Date: May 20, 2016

(87) PCT Pub. No.: WO2015/074702
PCT Pub. Date: May 28, 2015

(65) Prior Publication Data
US 2016/0298789 A1   Oct. 13, 2016

(51) Int. Cl.
| | |
|---|---|
| *F16K 35/04* | (2006.01) |
| *F16H 25/22* | (2006.01) |
| *F16K 31/50* | (2006.01) |
| *F16H 25/24* | (2006.01) |
| *F16K 3/02* | (2006.01) |
| *F16H 25/20* | (2006.01) |

(52) U.S. Cl.
CPC ......... *F16K 35/04* (2013.01); *F16H 25/2204* (2013.01); *F16H 25/2252* (2013.01); *F16H 25/2266* (2013.01); *F16H 25/2454* (2013.01); *F16K 3/0254* (2013.01); *F16K 31/508* (2013.01); *F16H 2025/2071* (2013.01)

(58) Field of Classification Search
CPC ...... F16K 35/04; F16K 3/0254; F16K 31/508; F16H 25/2204; F16H 25/2266; F16H 25/2454; F16H 25/2252; F16H 2025/2071
USPC ........................................................ 251/297
See application file for complete search history.

(56) References Cited

U.S. PATENT DOCUMENTS

2003/0038266 A1   2/2003   Hallden et al.

FOREIGN PATENT DOCUMENTS

WO        2012088008 A1   6/2012

*Primary Examiner* — Marina Tietjen
(74) *Attorney, Agent, or Firm* — 2SPL Patentanwaelte PartG mbB; Mani Arabi

(57) ABSTRACT

The valve operator assembly is provided includes a housing, an input member rotatably mounted, and a transmission mechanism including a translating element and a rotating element connected to the input member, said transmission mechanism being adapted to convert applied rotation of the input member into axial translation of said translating element.

Figure 1:
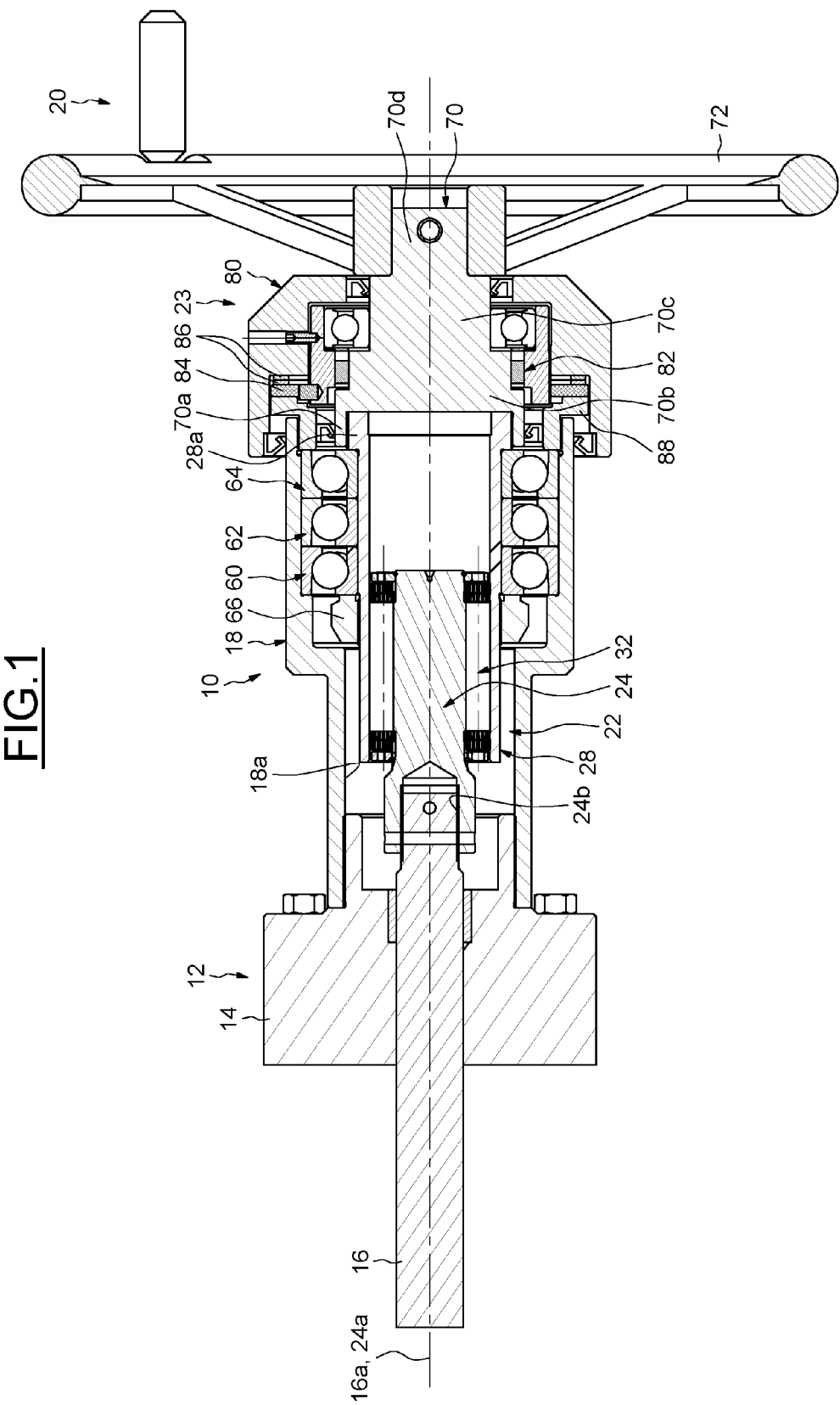

The assembly further includes a locking mechanism provided with a casing mounted on the transmission mechanism and/or the housing, with a freewheel including a plurality of locking members mounted in radial contact with the transmission mechanism and with the casing, and with friction means axially disposed between the casing and the housing and mounted in axial contact with said housing. The friction means, the freewheel and the casing cooperate together to lock the transmission mechanism with the housing in a static position of said assembly.

16 Claims, 6 Drawing Sheets

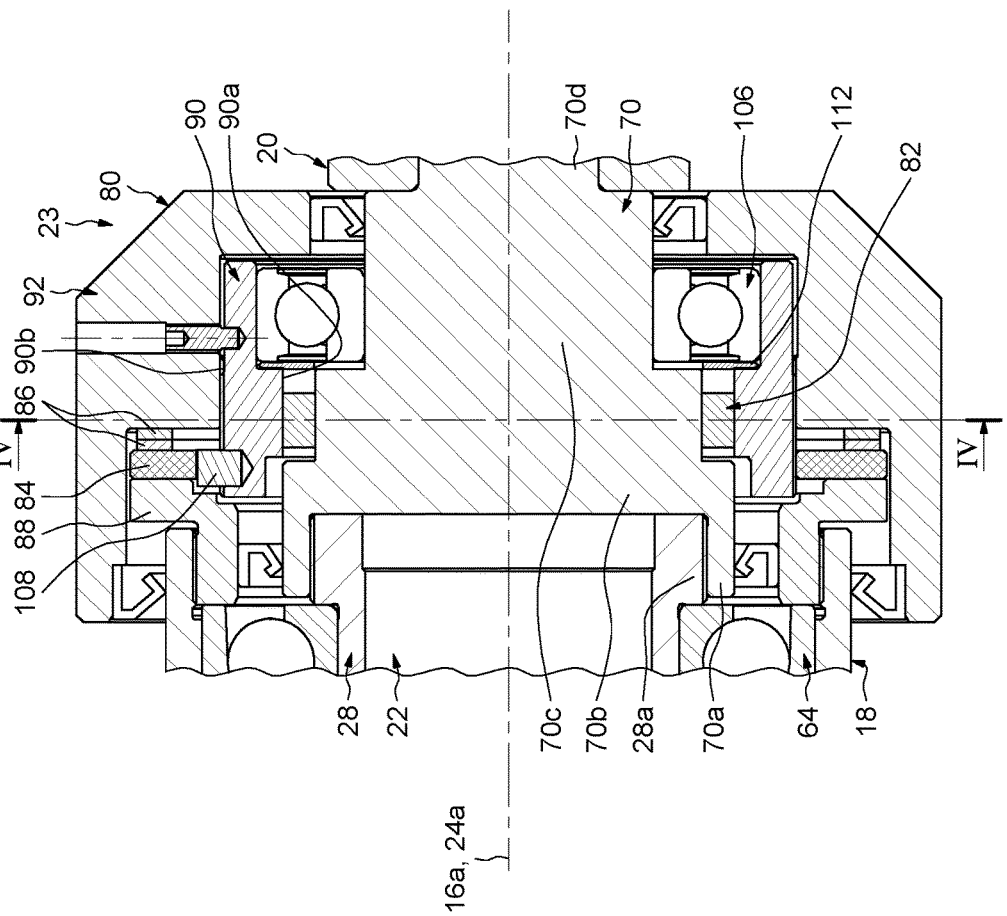

VALVE OPERATOR ASSEMBLY WITH FREEWHEEL AND AXIAL FRICTION MEANS

The present invention relates to the fields of valves and manually operable valves, for instance gate valves, control or regulation valves or chokes valves. More particularly, the invention relates to a valve operator assembly for a gate valve.

Valves are used in a variety of industries to control the flow of fluids. In particular, gate valves are used extensively in the oil and gas industry to control the flow of produced fluids at various stages of production. Most gate valves used in this industry comprise a valve body having a longitudinal flow bore and a transverse gate cavity that intersects the flow bore. A gate having a gate opening extending transversely therethrough is disposed in the gate cavity. A valve stem is provided for moving the gate between an open position, in which the gate opening is aligned with the flow bore, and a closed position, in which the gate opening is offset from the flow bore. The gate cavity of the valve body is covered by a bonnet having an axial bore through which passes the valve stem.

Such a gate valve is associated to a valve operator assembly for selectively driving the valve stem up and down in order to close and open the gate valve. A gate valve may be manually actuated. In this case, the valve operator assembly generally comprises a transmission mechanism to convert the rotational motion of a hand-wheel into axial motion of the valve stem. To quickly open and close the gate valve with a minimum number of turns, the transmission mechanism may be a ball screw mechanism or a planetary roller screw mechanism in order to reduce the operating torque, for instance manual hand-wheel torque or powered with electric drive for surface valves or with remote operating vehicle (ROV) or electric actuation for subsea valves. For more details, it is possible for example to refer to the patent EP-B1-1 419 334 (SKF).

Since such a screw mechanism is susceptible to back-drive under fluid pressure, the gate valve can be inadvertently opened or closed. Such back-driving can not only cause problems with the desired flow regulation, but can also lead to injury to an operator, for example from being struck by the rotating hand-wheel.

Accordingly, a balance system is generally provided on the valve body of the gate valve to prevent a back-driving of the transmission mechanism with the force exerted by the fluid. Such system comprises a balance stem disposed on the valve body and which is exposed to fluid pressure to offset or balance the force exerted on the gate.

However, it is necessary to modify the design of the valve body to integrate such a balance system on the gate valve. This leads to a complex structure of the gate valve. Besides, the required space for the gate valve is significantly increased.

One aim of the present invention is to overcome these drawbacks.

It is a particular object of the present invention to provide a valve operator assembly for valve, for instance gate valve, control or regulation valve or choke valve, which is not reversible or back-driveable.

In one embodiment, the valve operator assembly is provided for a valve comprising a valve body and a valve translating member axially moveable. The assembly comprises a housing adapted to be mounted on the valve, an input member rotatably mounted with respect to said housing, and a transmission mechanism comprising a translating element adapted to be connected to the valve translating member of the valve and a rotating element connected to the input member. Said transmission mechanism is adapted to convert applied rotation of the input member into axial translation of said translating element. The assembly further a locking mechanism provided with a casing mounted on the transmission mechanism and/or the housing, with at least one freewheel comprising a plurality of locking members mounted in radial contact with the transmission mechanism and with the casing, and with friction means axially disposed between the casing and the housing and mounted in axial contact with said housing. The friction means, the freewheel and the casing cooperate together to lock the transmission mechanism with the housing in a static position of said assembly.

Advantageously, the freewheel is arranged in such a way that, in the static position, the locking members are in a locked position in order to generate a braking torque opposite to a backdriving torque of the transmission mechanism.

In one preferred embodiment, the locking members are in the locked position when the input member rotates relative to the housing in the direction of the backdriving torque of the transmission mechanism. Preferably, the locking members switch and stay in an unlocked position when the input member rotates in the opposite direction of said backdriving torque.

In one preferred embodiment, the friction, means are adapted to create a friction torque between said friction means and the housing so that the total friction torque of the assembly is greater than or equal to the backdriving torque of the transmission mechanism. Advantageously, the friction means may be adapted to create a friction torque between said friction means and the housing which is greater than or equal to said backdriving torque.

The friction means may be fixed together with the casing in circumferential direction.

In one preferred embodiment, the locking mechanism further comprises at least one pre-stressing element acting axially on the friction means to maintain the axial contact between said friction means and the housing. The friction means may be movable in axial direction relative to the transmission mechanism, to the housing and to the casing under the action of the pre-stressing element. Preferably, the pre-stressing element is axially located between the friction means and the casing. The pre-stressing element may be mounted in axial contact with the friction means and with the casing. The pre-stressing element may comprise mechanical actuator.

In one embodiment, the casing comprises an inner bushing supporting the friction means and mounted in radial contact with the locking members of the freewheel, and an outer body secured onto said inner bushing. The pre-stressing element may bear axially against the outer body of the casing.

The transmission mechanism may further comprise an adapter sleeve connected to the rotating element of said mechanism and onto which is mounted the input member. In one embodiment, the locking mechanism is disposed between the adapter sleeve and the housing. Alternatively, the locking mechanism may be disposed between the rotating element of the transmission mechanism and the housing.

In one embodiment, the transmission mechanism comprises a screw, a nut surrounding and coaxial with said screw, and a plurality of rolling elements radially disposed between the screw and the nut. Each rolling element may be engaged in both outer and inner threads provided on the screw and the nut.

In one embodiment, the screw forms the translating element and the nut is connected to the input member. Alternatively, the nut may form the translating element and the screw is connected to the input member.

Preferably, the valve operator assembly further comprises at least one rolling bearing radially disposed between the transmission mechanism and the housing. The locking mechanism may further comprise one rolling bearing radially disposed between the casing and the transmission mechanism.

The invention also relates to a valve, notably a gate valve, a control or regulation valve or a choke valve comprising a valve body, a valve translating member axially moveable and a valve operator assembly as previously defined. The valve translating member may be a valve stem or a piston for instance.

Figure 2:
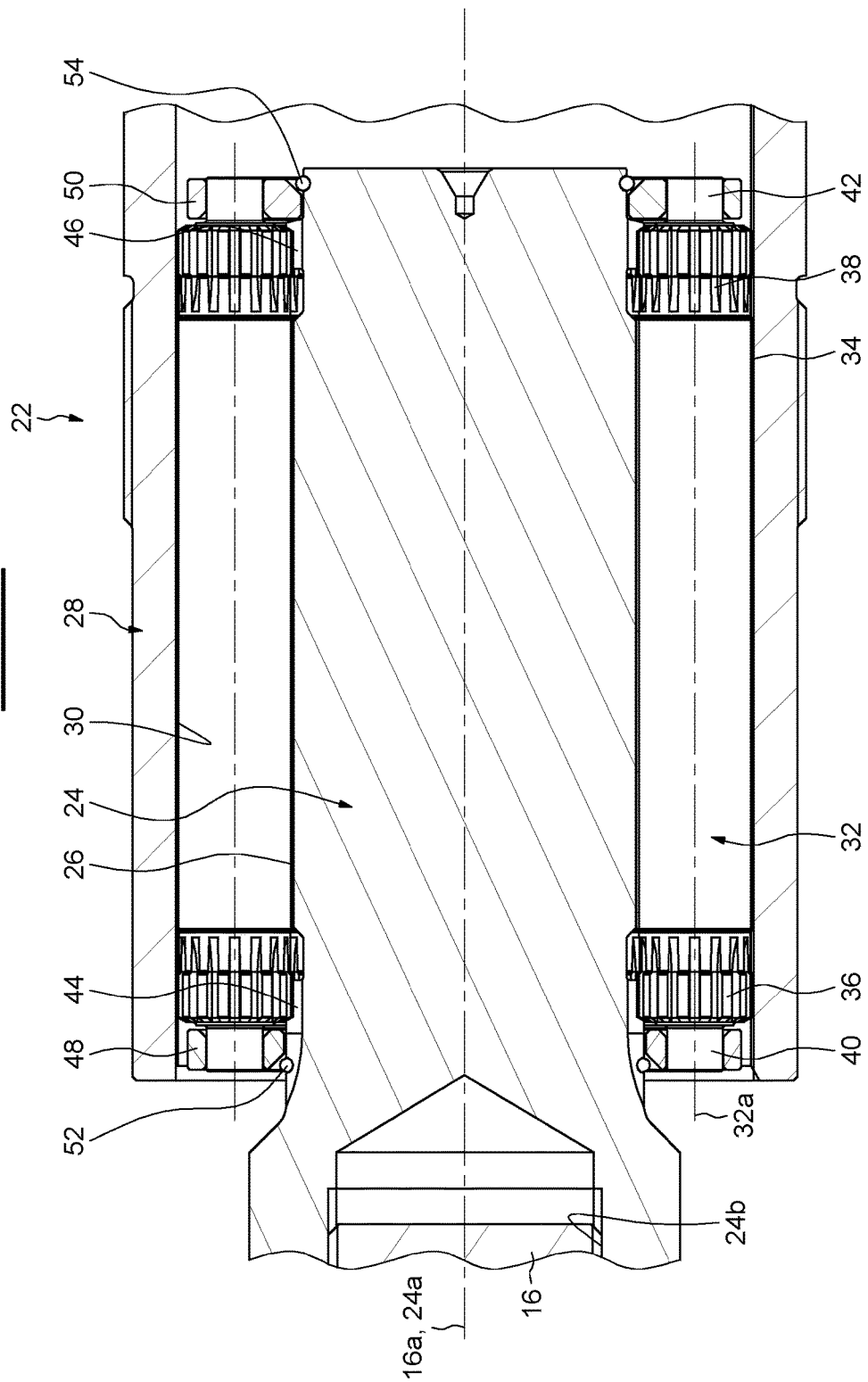
Figure 5:
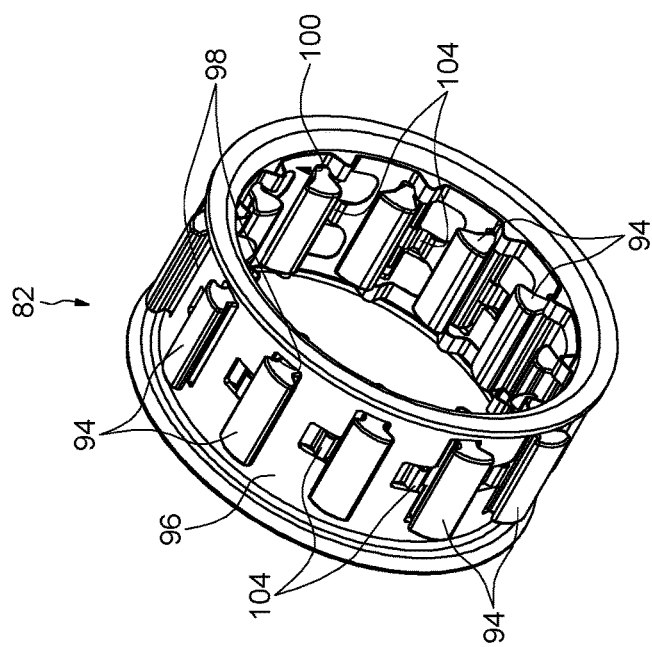
Figure 4:
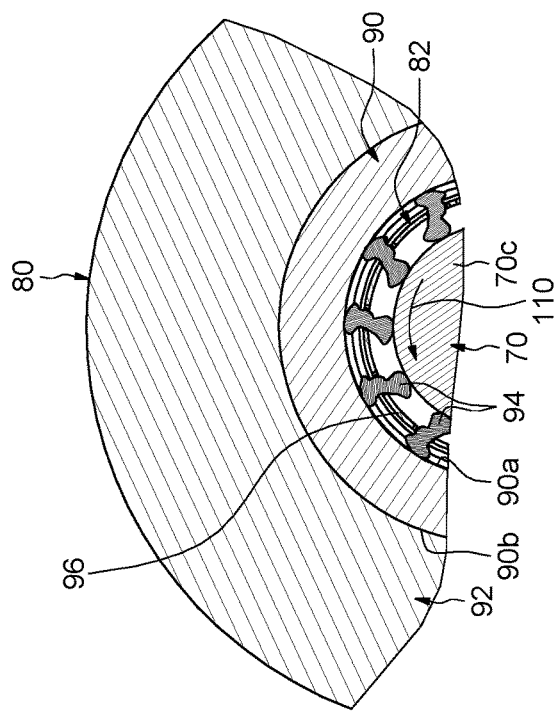
Figure 6:
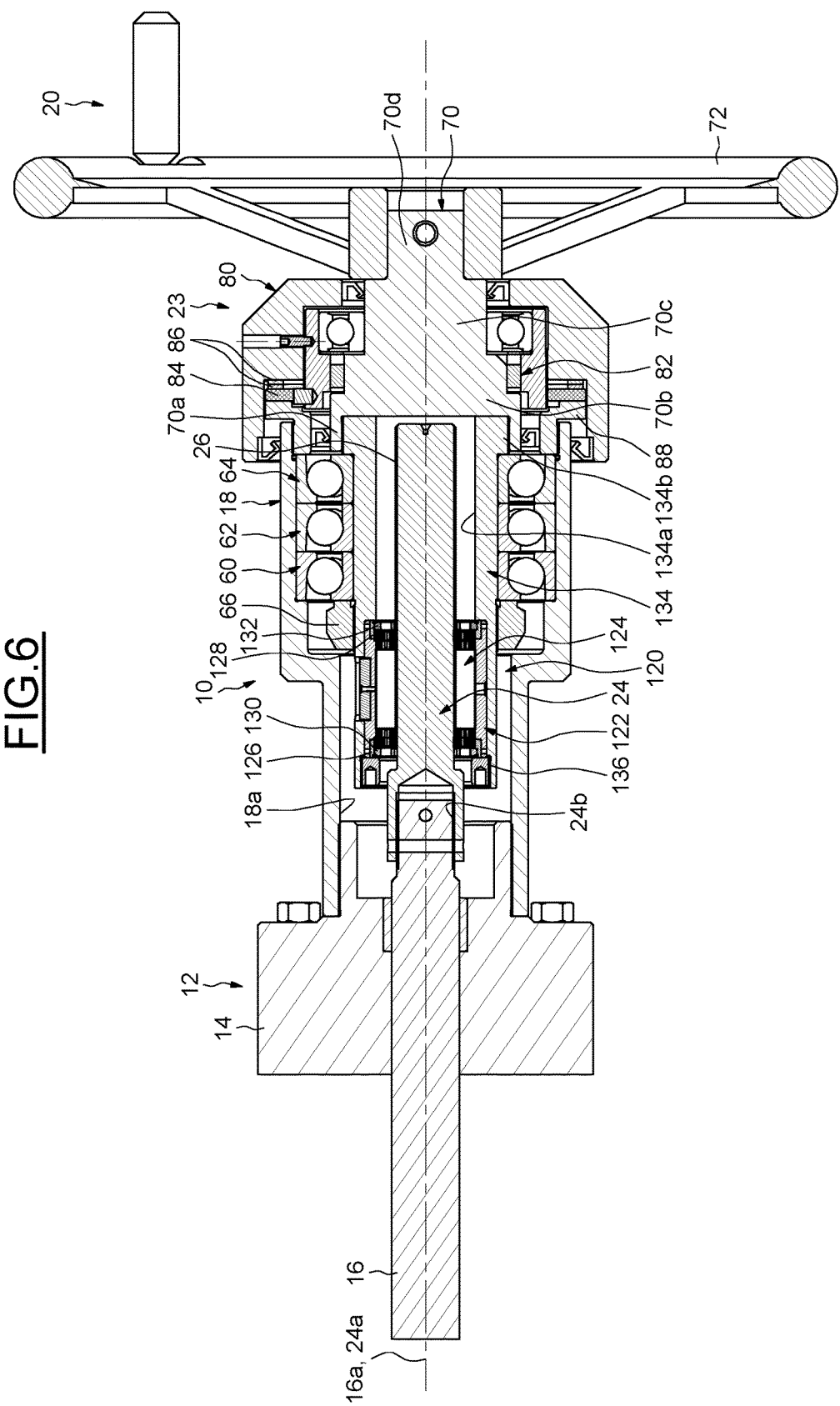
Figure 7:
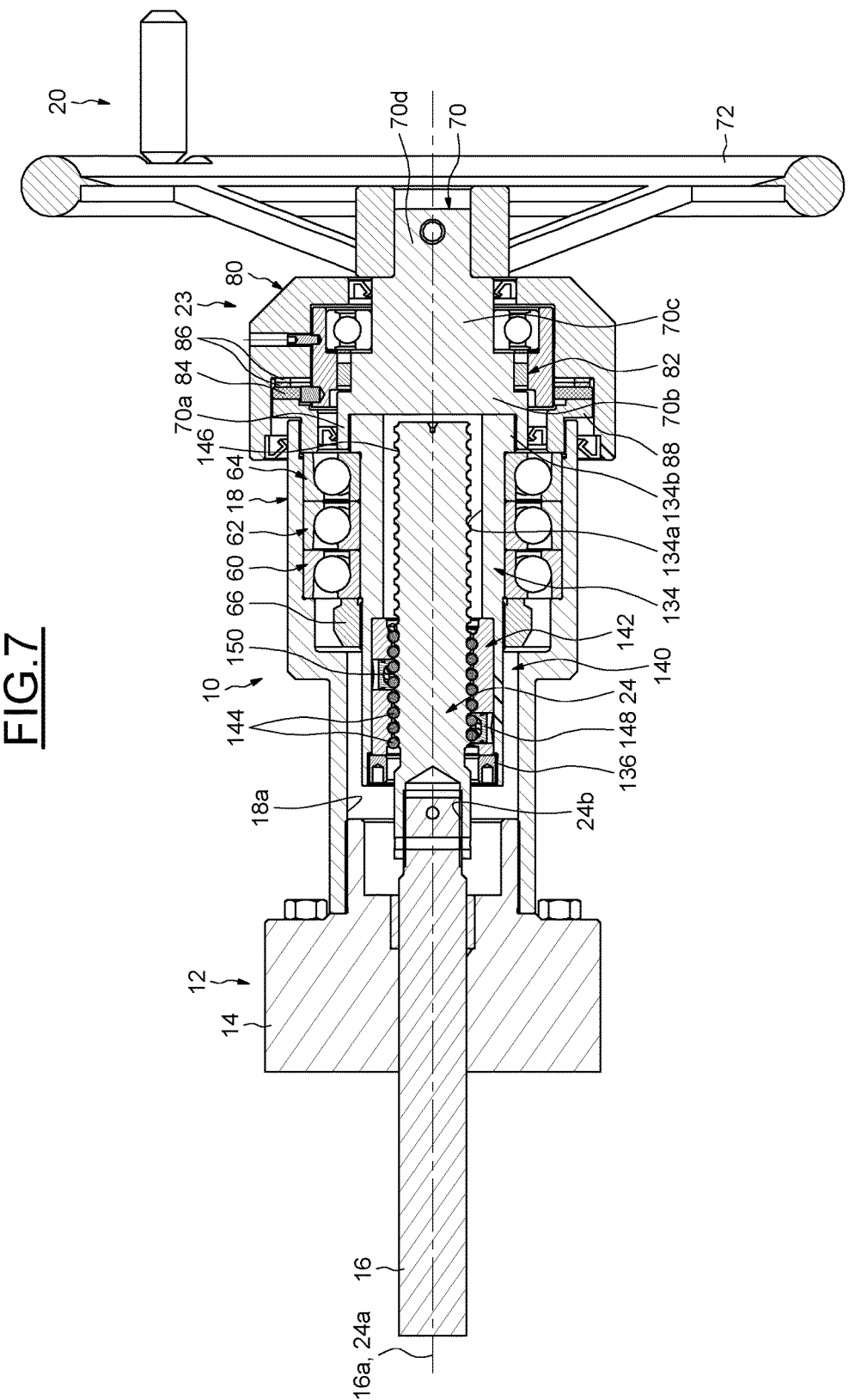

The present invention and its advantages will be better understood by studying the detailed description of specific embodiments given by way of non-limiting examples and illustrated by the appended drawings on which:

FIG. 1 is a cross-section of a valve operator assembly for gate valve according to a first example of the invention, FIG. 2 is a cross-section of an inverted roller screw mechanism of the assembly of FIG. 1, FIG. 3 is a detail view of FIG. 1, FIG. 4 is a section on IV-IV of FIG. 3, FIG. 5 is a perspective view of a freewheel of the assembly of FIG. 1, FIG. 6 is a cross-section of a valve operator assembly for gate valve according to a second example of the invention, and FIG. 7 is a cross-section of a valve operator assembly for gate valve according to a third example of the invention.

A valve operator assembly 10 as shown on FIG. 1 is adapted for a gate valve 12 provided with a bonnet 14, a valve body (not shown) covered by said bonnet and a moveable valve stem 16 with an axis 16a. Conventionally, the valve body has a flow bore and a transverse gate cavity that intersects the flow bore. The gate valve also comprises a gate having a gate opening extending transversely therethrough is disposed in the gate cavity. For more detail on such a gate valve, it could be referred to EP-B1-1 419 334 (SKF) which is hereby incorporated by reference.

The valve operator assembly 10 comprises a tubular housing 18 mounted on the bonnet 14 of the gate valve, an input member 20 rotatably mounted with respect to said housing, and an inverted roller screw mechanism 22 interposed between said input member and the valve stem 16 of said valve to convert a rotational motion of the input member 20 into axial motion of the valve stem. The inverted roller screw mechanism 22 is mounted into a bore 18a of the housing and is connected to the input member 20. One axial end of the housing 18 is secured to the bonnet 14 by threads (not referenced). In the illustrated example, the bore 18a has a stepped form.

As will be described later, the valve operator assembly 10 further comprises a locking mechanism 23 disposed between the housing 18 and the inverted roller screw mechanism 22 and adapted to prevent the back-driving of such mechanism under fluid pressure exerted on the valve stem 16.

As shown more clearly on FIG. 2, the inverted roller screw mechanism 22 comprises a screw 24, with an axis 24a coaxial with the axis 16a of the valve stem 16, provided with an outer thread 26, a nut 28 mounted coaxially about the screw 24 and provided with an inner thread 30, the internal diameter of which is greater than the external diameter of the outer thread 26, and a plurality of longitudinal rollers 32 disposed radially between the screw 24 and the nut 28.

The screw 24 extends longitudinally through a cylindrical bore of the nut 28 on which the inner thread 30 is formed. The nut 28 has a tubular form and is elongated to accommodate the full extent of screw travel. Axially on the side opposite to the input member 20 (FIG. 1), a recess 24b is formed on a frontal radial surface of the screw 24 and into which is fixed an end of the valve stem 16 of the gate valve. The valve stem 16 is connected to the screw 24 by any appropriate means, for example by threads and/or a pin.

The rollers 32 are identical to each other and are distributed regularly around the screw 24. Each roller 32 extends along an axis 32a which is coaxial with the axis 24a of the screw and comprises an outer thread 34 engaging the thread 26 of the screw and the thread 30 of the nut. Each roller 20 also comprises, at each axial end, outer gear teeth 36, 38 extending axially outwards the outer thread 34 and which are themselves extended axially by a cylindrical stud 40, 42 extending outwards. Each gear teeth 36, 38 are axially located between the associated stud 40, 42 and the outer thread 34. The outer thread 34 of each roller is axially located between the two gear teeth 36, 38.

The roller screw mechanism 22 also comprises two annular gear wheels 44, 46 provided on the outer surface of the screw 24 and each comprising outer gear teeth meshing the gear teeth 36, 38 respectively of the rollers 32 for the synchronization thereof. Each gear wheel 44, 46 is axially located near to an end of the outer thread 26 of the screw. Said outer thread 26 is axially located between the two gear wheels 44, 46. In the disclosed embodiment, the gear wheels 44, 46 are formed directly on the outer surface of the screw 24. Alternatively, the gear wheels may be separate parts which are fixed onto the screw 24.

The mechanism 22 further comprises two annular guides or spacer rings 48, 50 disposed on the outer surface of the screw 24. Said spacer rings 48, 50 are radially disposed between the screw 24 and the inner thread 30 of the nut without contact with said thread. Each spacer ring 48, 50 is mounted on the outer surface of the screw 24 axially next to the associated gear wheel 44, 46. Each spacer ring 48, 50 is axially offset towards the outside of the nut 28 with regard to the associated gear wheel 44, 46. Each spacer ring 48, 50 comprises a plurality of cylindrical through-recesses (not referenced) which are distributed regularly in the circumferential direction and inside which the studs 40, 42 of the rollers are housed. The spacer rings 48, 50 enable the rollers 32 to be carried and the regular circumferential spacing thereof to be kept. The mechanism 22 further comprises elastic retainer rings 52, 54 each mounted in a groove (not referenced) formed on the outer surface of the screw 24 in order to axially hold the corresponding spacer ring 48, 50.

Referring once again to FIG. 1, the roller screw mechanism 22 further comprises an adapter sleeve 70 mounted on the nut 28. The sleeve 70 comprises an annular axial portion 70a secured to the flange 28a of the nut by any appropriate means, for example by threads, a radial portion 70b extending radially inwards said axial portion 70a and bearing axially against the end of the nut, a stepped axial portion 70c extending axially the radial portion 70b on the side opposite to the axial portion 70a, and a pin 70d projecting axially outwards from said stepped axial portion 70c. In the illustrated example, the input member 20 comprises an operable hand-wheel 72 secured to the adapter sleeve 70. The hand-wheel 72 is here secured onto the pin 70d of the sleeve. Said hand-wheel forms a rotational drive input.

The valve operator assembly 10 further comprises three rolling bearings 60 to 64 to guide the rotation of the nut 28 of the inverted roller screw mechanism relative to the housing 18. The rolling bearings 60 to 64 are radially mounted between the outer surface of the nut 28 and the stepped bore 18a of the housing. The rolling bearings 60 to 64 are mounted radially in contact with the outer surface of the nut 28 and a large diameter portion of the stepped bore 18a of the housing. In the disclosed example, the rolling bearings 60 to 64 are angular contact thrust ball bearings and are axially in contact one to another. A retaining ring 66 is secured on the outer surface of the nut 28 and axially bears against the rolling bearing 60. Axially on the opposite side, the rolling bearing 64 is axially mounted against a flange 28a of the nut 28 extending radially outwards the outer surface of said nut. The flange 28a is axially located at an axial end of the nut.

In the illustrated example, the locking mechanism 23 is located axially between the rolling bearings 60 to 64 and the input member 20. The locking mechanism 23 is coaxial with the axis 24a of the screw. The locking mechanism 23 is disposed between the adapter sleeve 70 of the transmission mechanism and the housing 18.

As shown more clearly on FIG. 3, the locking mechanism 23 comprises a casing 80 mounted around the adapter sleeve 70 and supported by said sleeve, a one-way clutch or freewheel 82 (schematically illustrated) radially disposed between the casing 80 and the sleeve 70, a friction ring 84 supported by the casing and mounted in axial contact with the housing 18, and a plurality of elastic washers 86 axially disposed between said friction ring and the casing 80. An "axial contact with the housing" is to be understood as a direct axial contact with the housing 18, or as an indirect radial contact by means of a part fixed onto said housing. Alternatively, the contact between the friction ring 84 and the housing 18 could be a combination of radial and axial contact, for instance in cases where there is a small taper. In these cases, there is still an axial contact. In the illustrated example, the housing 18 comprises an annular disk 88 secured at one axial end and onto which axially bears the friction ring 84. The disk 88 is secured to the bore 18a of the housing by any appropriate means, for example by threads. In the illustrated example, the disk 88 has a L-shaped section. Sealing means (not referenced) are provided between the disk 88 and the axial portion 70a of the adapter sleeve.

The casing 80 comprises an annular inner bushing 90 and an annular outer body 92 mounted onto said bushing. The bushing 90 radially surrounds the adapter sleeve 70 and is provided with a stepped bore 90a and with an opposite outer surface 90b onto which is mounted the body 92. Said body 92 is secured to the outer surface 90b of the bushing by any appropriate means, for example by threads and screws. Sealing means (not referenced) are provided between the body 92 and the housing 18, and provided between said body and the stepped axial portion 70c of the adapter sleeve.

As shown on FIGS. 4 and 5, the freewheel 82 comprises a plurality of wedging cams or sprags 94 and an annular cage 96 for retaining said sprags. The sprags 94 are disposed between outer and inner sliding tracks or raceways which are respectively formed by the casing 80 and the sleeve 70. More precisely, the outer sliding raceway is formed by the bore 90a of the bushing and the inner sliding raceway is formed by the outer surface of the axial portion 70c of the sleeve 70. The sprags 94 are movable between a locked position together with the sleeve 70 of the transmission mechanism and the casing 80. The sprags 94 are mounted in radial contact with the transmission mechanism 22 and with the casing 80. A "radial contact" is to be understood as a direct radial contact with the transmission mechanism 22 and with the casing 80, or as an indirect radial contact by means of a part fixed onto said transmission mechanism or casing. In the illustrated example, the sprags 94 are axisymmetric in shape.

The cage 96 comprises a plurality of windows or pockets 98 for the sprags 94. The pockets 98 are evenly spaced relative to one another in the circumferential direction. There is no contact between the cage 96 and the sleeve 70, or between said cage and the casing 80. The cage 96 of annular overall shape may be advantageously formed from a thin metal sheet blank by folding, cutting and stamping, or alternatively from a synthetic material such as a polyamide.

The freewheel 82 further comprises a spring 100 mounted inside the cage 96 in radial contact with the bore of said cage. The spring 100 is made in the form of an annular metal strip wound on itself and connected end-to-end or with partial overlap. The spring 100 may be formed for example from a thin metal sheet blank by folding, cutting and stamping, or else by moulding a synthetic material such as polyamide.

The spring 100 comprises a plurality of cavities or pockets (not referenced) which are uniformly circumferentially spaced relative to one another and face the pockets 98 of the cage in order to be able to mount the sprags 94. The spring 100 also comprises at least one elastic return tongue 104 per sprag 94 originating from the edge of a pocket and projecting circumferentially into said pocket for urging the associated sprag 94. Each tongue 104 is designed to press against the associated sprag 94 so as to exert a tilting torque that tends to keep the sprags 94 in contact with the outer and inner sliding raceways. The tongues 104 are identical each other and disposed between the cage 96 and the sprags 94. As a variant, it would be possible to provide an individual return element associated with each sprag, for example an elastic return spring placed between the sprag 94 and the cage 96.

Referring once again to FIG. 3, the locking mechanism 23 further comprises a rolling bearing 106 to guide the rotation of the adapter sleeve 70 of the transmission mechanism relative to the casing 80. The rolling bearing 106 is radially interposed between the axial portion 70c of the sleeve and the bore 90a of the inner bushing of the casing. The rolling bearing 106 is axially located near to the freewheel 82 while remaining distant from the latter. The valve operator assembly 10 also comprises a protective washer 112 axially interposed between the rolling bearing 106 and the freewheel 82, and which axially bears against the bushing 90 of the casing.

The friction ring 84 and the elastic washers 86 are axially located between the housing 18 and the casing 80. The friction ring 84 and the elastic washers 86 are radially located between the inner bushing 90 and the outer body 92 of the casing. The friction ring 84 is distinct from the elastic washers 86. As will be described later, the friction ring 84 is movable in the axial direction relative to the transmission mechanism 22, to the housing 18 and to the casing 80 under the action of the springs 82.

The friction ring 84 has an annular form and is frictionally engaged with the disk 18 of the housing 18. The friction ring 84 is supported by the casing 80. In the illustrated example, the friction ring 84 is supported by the inner bushing 90 of the casing and mounted on its outer surface 90b. A pin 108 is provided on the outer surface 90b of the bushing and protrudes radially into a recess formed on the bore of the friction ring 84. The friction ring 84 is fixed together with the bushing 90 of the casing in the circumferential direction. The friction ring 84 may be made from metal, from plastic material, from composite material or from combination of materials. As will be described later, the friction ring 84 is adapted to create a friction torque between said ring and the housing 18 so that the total friction torque of the assembly 10 is greater than or equal to the backdriving torque of the transmission mechanism 22.

The elastic washers 86 are axially disposed between the friction ring 84 and the outer body 92 of the casing 80. The elastic washers 86 are axially located on the side opposite to the housing 18 with regard to the friction ring 84. In the illustrated example, the friction ring 84 is in axial contact against the disk 88 of the housing on one side and in axial contact with the elastic washers 86 on the other side. The elastic washers 86 are annular, identical to one another and are axially stacked. In the illustrated example, the washers 86 are wave spring washers. Alternatively, the washers 96 may be of the Belleville type. One of the elastic washers 86 axially bears against the friction ring 84 while the other washer 86 axially bears against the outer body 92 of the casing.

The elastic washers 86 exert a permanent axial force on the friction ring 84 which tends to push said friction ring against the disk 88 of the housing. The washers 86 act on the friction ring 84 by exerting an axial preload. The axial force applied by the washers 86 pre-stresses the friction ring 84 against the housing 18 in order to maintain an axial contact therebetween.

In a static position of the valve operator assembly 10, i.e. when no torque is applied on the hand-wheel 72, only a fluid pressure is exerted both on the valve stem 16 and the screw 24 of the transmission mechanism. The backdriving torque of the transmission mechanism 22 which is susceptible to occur under fluid pressure is illustrated on FIG. 4 by the arrow 110. In the illustrated example, said backdriving torque is oriented in the counterclockwise direction. The freewheel 82 is mounted in such a way that, in the static position, the sprags 94 are in the locked position between the sleeve 70 of the transmission mechanism and the casing 80 in order to generate a braking torque having a direction opposite to the one of the backdriving torque.

The friction ring 84 creates a predetermined friction torque between said ring and the housing 18 so that the total friction torque of the assembly 10 is greater than or equal to the backdriving torque of the transmission mechanism 22. Advantageously, the friction ring 84 creates a friction torque which is greater than or equal to said backdriving torque. There is no angular movement of the friction ring 84 relative to the housing 18 under fluid pressure. The material of the friction ring 84 and/or its radial length are determined in order to obtain the desired friction torque.

In this static position, the casing 80 and the friction ring 84 are locked in rotation on the inner side by the freewheel 82. There is no relative angular movement between the freewheel 82 and the casing 80 and the friction ring 84. Besides, the friction torque between the friction ring 84 and the housing 18 prevents a relative angular movement between these two elements. Accordingly, the sleeve 70 of the transmission mechanism is secured or locked with the fixed housing 18. The locking mechanism 23 acts as coupling means frictionally engage with the housing 18 so as to prevent a relative circumferential movement between said housing and the transmission mechanism in a static position.

In a static position of the valve operator assembly 10, the prevention of the back-driving of the inverted roller screw mechanism 22 is guaranteed. The backdriving is not guaranteed by the roller screw mechanism 22 itself but by the assembly 10 comprising said mechanism and surrounding components including the freewheel 82 and the friction ring 84. Under fluid pressure exerted both on the valve stem 16 and the screw 24, the mechanism 22 is not reversible or back-driveable. The force exerted by the fluid is not transformed into an angular displacement of the nut 28 relative to the housing 18. Accordingly, it is possible to not foresee a balance system, such as a balance stem, on the valve body of the gate valve. Even with balanced design, the valve operator may also be used if the balance stem cannot fully balance the pressure in closed or open position. In this case, the small unbalance that may exist could be locked.

When an operator applies a torque on the hand-wheel 72 in the direction according to which the force exerted by the fluid on the valve stem 16 of the valve gate helps the axial movement of the screw 24, the freewheel 82 remains in the locked position between the adapter sleeve 70 of the transmission mechanism and the casing 80. The operating torque is applied in the same direction as the backdriving torque of the transmission mechanism 22. When the input member 20 rotates in the direction of the backdriving torque 110, the freewheel 82 is in the locked position.

When the manipulating torque applied by the operator is greater than the friction torque between the friction ring 84 and the housing 18 together with the useful torque to actuate the gate valve, both the sleeve 70 and nut 28 of the inverted roller screw mechanism, the casing 80 and the friction ring 84 rotate in the same direction relative to the housing 18. With the rotation of the nut 28, the rollers 32 rotate on themselves about the screw 24 and move axially and additionally rotate in the nut 28. The rollers 32 are rotationally guided by outer gear wheels 44, 46 provided on the screw and meshing with the gear teeth of the rollers. Both the rollers 32 and the screw 24 are axially or longitudinally moveable into the nut 28. Accordingly, the rotational motion of a hand-wheel 72 is converted into an axial motion of the valve stem 16 of the valve gate.

The sliding of the friction ring 84 on the housing 18 generates a torque which increases the required torque on the hand-wheel 72 but in an affordable way since the force exerted by the fluid on the valve stem 16 of the valve gate helps to reduce the force on the screw 24 and then helps the displacement of said screw.

When the operator applies an opposite torque on the hand-wheel, the sprags 94 pivot or tilt in the opposite direction which causes the unlocking or freeing of said sprags. With said applied torque, the freewheel 82 switches in the unlocked position between the sleeve 70 of the transmission mechanism and the casing 80. The sleeve 70 and the nut 28 of the inverted roller screw mechanism rotate relative to the freewheel 82, to the friction ring 84, to the casing 80 and to the housing 18 since the drag torque of said freewheel is smaller than the friction torque between the friction ring 84 and the housing 18. An angular movement of the friction ring 84 relative to the housing 18 and to the freewheel 82 is prevented.

The angular displacement of the hand-wheel 72 is converted into an axial motion of the valve stem 16 of the valve gate in the direction opposite to the pressure direction. The required torque on the hand-wheel 72 is limited to the useful torque to actuate the gate valve 12 together with the drag torque of the freewheel 82. Accordingly, with the use of the freewheel 82, it is not necessary to apply an extra torque to counter the friction torque exerted by the friction ring 84. When the operator do not apply anymore a torque in the opposite direction of the backdriving torque, the freewheel 82 switches in the locked position.

In the valve operator assembly 10, the freewheel 82 cooperates with the casing 80, and the friction ring 84 secured on said casing in the circumferential direction cooperates by friction with the fixed housing 18 to block the transmission mechanism 22 together with said housing when no torque is applied on the input member 20, i.e. when said input member remains at a particular angular position with regard to the housing 18. In such static position, the transmission mechanism 22 is rigidly connected to the housing 18 by the locking action of the freewheel 82 and the friction between the friction ring 84 and the housing 18. The transmission mechanism 22 is rigidly locked with the housing 18 to prevent a back-driving movement of said mechanism with the force exerted by the fluid on the screw 24. In the static position of the assembly 10, the locking mechanism 23 forms coupling means between the transmission mechanism 22 and the housing 18.

Besides, the freewheel 82 of the locking mechanism enables to limit the required torque on the input member 20 to actuate the screw 24 of the transmission mechanism and the valve stem 16 of the valve gate in the direction opposite to the force exerted by the fluid. As a matter of fact, in this case, an angular movement of the friction ring 84 relative to the housing 18 is prevented.

Otherwise, with the use of the elastic washers 86 which axially act on the friction ring 84 and exert an axial force directed towards the housing 12, the axial friction contact between said housing and the friction ring 84 is maintained even with a wear of said ring. The elastic washers 86 enable to achieve a permanent axial contact between the friction ring 84 and the housing 12.

In case of wear of the friction ring 84, under the axial action exerted by the elastic washers 86, the friction ring 84 moves axially relative to the transmission mechanism 22 and to the casing 80 towards the housing 18. The axial load of the elastic washers 86 pre-stresses the friction ring 84 towards the housing 18. This load therefore makes it possible to take-up any axial clearance if a wear of the friction ring 84 occurs. The elastic washers 86 thus make it possible to achieve a permanent axial friction contact between the friction ring 84 and the housing 18.

In this illustrated example, the friction ring 84 is in axial contact against the housing 18 on one side and in axial contact with the elastic washers 86 on the other side. Alternatively, it could be possible to provide a tapered contact between the friction ring 84 and the housing 18 and/or the washers 86. Accordingly, there is a combination of radial and axial contact.

In this first illustrated example, the invention has been illustrated on the basis of a valve operator assembly 10 for gate valve comprising an inverted roller screw mechanism 22. This leads to a high load capacity of the assembly 10 since the inverted roller screw mechanism thread geometry can be larger than with other type of roller screw mechanism since there is no minimum number of starts required. This increases load capacity while keeping compactness advantage. Additionally, smaller lead will help to reduce drive torque. Consequently, the backdriving torque will be reduced. The lifetime of the assembly 10 is also increased. Otherwise, the required space for the assembly 10 is reduced.

However, the invention can also be applied to a valve operator assembly having other type of roller screw mechanism such as standard planetary roller screw mechanism as shown on FIG. 6.

In this second example, in which identical parts are given identical references, the valve operator assembly 10 is provided with a planetary roller screw mechanism 120 interposed between the input member 20 and the valve stem 16 of the valve gate and which comprises a nut 122 mounted coaxially about the screw 24 and provided with an inner thread, and a plurality of identical rollers 124 disposed radially between the screw 24 and the nut 122 and having a design similar to the one of the inverted roller screw mechanism as previously described. In this example, the outer thread 26 of the screw 24 has an elongated length.

The mechanism 120 also comprises two annular gear wheels 126, 128 mounted in a non-threaded part of the nut 122 and each comprising inner gear teeth meshing the gear teeth of the rollers 124 for the synchronization thereof. Each gear wheel 126, 128 axially bears against a radial surface of the nut 122 provided between the inner thread and the associated non-threaded part of said nut.

The mechanism 120 further comprises two spacer rings 130, 132 each mounted radially between the screw 24 and the associated gear wheel 126, 128, and elastic retainer rings (not referenced) each mounted in a groove formed on the bore of the associated gear wheel 126, 128 in order to axially hold the corresponding spacer ring 130, 132. Each spacer ring 130, 132 is provided with a plurality of axial through-holes inside which the studs of the rollers 124 are housed.

The mechanism 120 also comprises an outer sleeve 134 having an axial bore 134*a* having a stepped form and inside which are housed the nut 122 and the rollers 124. The nut 122 is secured to the sleeve 134. The gear wheel 128 axially bears against a radial annular shoulder of the stepped bore 134*a* of the nut. Axially on the opposite side, a retaining ring 136 is secured into said bore and axially comes into contact against the other gear wheel 126 of the mechanism.

The rolling bearings 60 to 64 are mounted on the outer surface of the sleeve 134. The sleeve 134 is radially interposed between the nut 122 and the rolling bearings 60 to 64. The rolling bearing 64 is axially mounted against a flange 134*b* of the sleeve extending radially outwards the outer surface of said sleeve. The flange 134*b* is axially located at an axial end of the sleeve. In this example, the adapter sleeve 70 of the input member is secured to the flange 134*b* of the outer sleeve and axially bears against said flange. Alternatively, it could be possible to make the nut 122 and the sleeve 134 in one single part. In this case, the rolling bearings 60 to 64 are mounted directly on the outer surface of the nut.

When an operator applies a torque on the hand-wheel 72, this torque is transmitted to the adapter sleeve 70 and then to the outer sleeve 134 and the nut 122 of the planetary roller screw mechanism. With the rotation of the nut 122, the rollers 124 rotate on themselves and roll about the screw 24 without moving axially inside said nut. Accordingly, the screw 24 is axially or longitudinally moveable into the nut 122 and the rotational motion of a hand-wheel 72 is converted into an axial motion of the valve stem 16 of the valve gate. The locking mechanism 23 acts as previously described.

The two first illustrated examples respectively deal with an inverted roller screw mechanism and a standard planetary roller screw mechanism. The invention can also be applied to a valve operator assembly having other type of roller screw mechanism wherein the rollers are deprived of outer threads but have grooves into which are engaged the threads of the screw and the nut and axially move with respect to said screw and nut. After a complete revolution, each roller is returned to its initial position by cams provided at the ends of the nut. Such mechanism is called a recirculating roller screw and may be of the standard or inverted type.

In the third example illustrated on FIG. 7, in which identical parts are given identical references, the valve operator assembly 10 is provided with a standard ball screw mechanism 140 comprising a nut 142 mounted coaxially about the screw 24 and provided with an inner thread, and a plurality of identical balls 144 disposed radially between the screw 24 and the nut 142 and which engage the thread of said nut and the thread 146 of the screw. The nut 142 is mounted into the bore 134a of the outer sleeve 134 and axially bears against a radial annular shoulder of said bore. Axially on the opposite side, the retaining ring 136 is secured into the bore 134a of the outer sleeve and axially comes into contact against the nut 142. The nut 142 is secured to the outer sleeve 134. Alternatively, the nut 142 and the sleeve may be made in one part. The nut 142 comprises recirculating means 148, 150 mounted into its thickness to achieve the recirculation of the balls 144. Such mechanism is called a standard ball screw. Alternatively, recirculating means may be provided on the screw. Such mechanism is called an inverted ball screw.

Otherwise, the invention can also be applied to a valve operator assembly having other type of transmission mechanism adapted to convert a rotation into a linear movement, for instance a directed threaded connection. However, such transmission mechanism requires large actuation torques.

In the disclosed examples, the casing 80 is made in two separate parts, i.e. the inner bushing 90 and the outer body 92. In a variant, it could be possible to have a casing made in one single part. In the illustrated examples, the friction means only comprise a friction ring. Alternatively, the friction means may further comprise a support ring onto which is mounted the friction ring. In this case, one of the elastic washers axially bears against the support ring. In the illustrated examples, the freewheel comprises a plurality of sprags acting as locking members. Alternatively, other type of freewheel may be used for example a freewheel with locking rollers.

In the previous examples, two elastic washers are provided to bias the friction ring 84 against the housing 18. The number of washer(s) may be increased or reduced. Alternatively, it is also possible to provide other mechanical actuator(s) to exert an axial preload on the friction ring 84, such as elastic compression spring or torsion spring, or a pre-stressing or preloaded element having a toroidal form and made from elastic material, for example an elastomer such as nitrile rubber or polyurethane.

In the disclosed examples, the locking mechanism is provided with pre-stressing or preloaded elements to maintain the axial contact between the friction ring 84 and the housing even with a wear of said friction ring. In a variant, it could be possible to not foresee such pre-stressing elements. However, in this case, the permanent axial contact between the friction ring 84 and the housing 18 cannot be guaranteed.

Although the invention has been illustrated on the basis of a valve operator comprising a screw connected to the valve stem of the gate and a nut connected to the input member, it should be understood that the invention can be applied with a screw connected to the input member and a nut connected to the valve stem. In this case, the nut acts as the translating element and the screw acts as the rotating element. Accordingly, the adapter sleeve is connected to the screw. Although the invention has been illustrated on the basis of a valve operator assembly for gate valve, it should be understood that the invention can also be used with other types of valves, for instance control or regulation valves or choke valves. The valve operator assembly may be used for instance with a surface gate or a subsea valve gate which may be actuated by a remote operating vehicle (ROV) or an actuator.

The invention claimed is:

1. Valve operator assembly for valve comprising a valve body and a valve translating member axially moveable, the assembly comprising a housing adapted to be mounted on the valve, an input member rotatably mounted with respect to said housing, and a transmission mechanism comprising a translating element adapted to be connected to the valve translating member of the valve and a rotating element connected to the input member, said transmission mechanism being adapted to convert applied rotation of the input member into axial translation of said translating element, characterized in that the assembly further comprises a locking mechanism provided with a casing mounted on the transmission mechanism and/or the housing, with at least one freewheel comprising a plurality of locking members mounted in radial contact with the transmission mechanism and with the casing, and with friction means axially disposed between said casing and the housing and mounted in axial contact with said housing, the friction means, the freewheel and the casing cooperating together to lock the transmission mechanism with the housing in a static position of said assembly.

2. Valve operator assembly according to claim 1, wherein the freewheel is arranged in such a way that, in the static position, the locking members are in a locked position in order to generate a braking torque opposite to a backdriving torque of the transmission mechanism.

3. Valve operator assembly according to claim 2, wherein the locking members are in the locked position when the input member rotates relative to the housing in the direction of the backdriving torque of the transmission mechanism and wherein the locking members switch in an unlocked position when the input member rotates in the opposite direction of said backdriving torque.

4. Valve operator assembly according to claim 1, wherein the friction means are adapted to create a friction torque between said friction means and the housing so that the total friction torque of the assembly is greater than or equal to a backdriving torque of the transmission mechanism.

5. Valve operator assembly according to claim 4, wherein the friction means are adapted to create a friction torque between said friction means and the housing greater than or equal to said backdriving torque.

6. Valve operator assembly according to claim 1, wherein the friction means are fixed together with the casing in circumferential direction.

7. Valve operator assembly according to claim 1, wherein the locking mechanism further comprises at least one pre-stressing element acting axially on the friction means to maintain the axial contact between said friction means and the housing.

8. Valve operator assembly according to claim 7, wherein the friction means are movable in axial direction relative to the transmission mechanism, to the housing and to the casing under the action of the pre-stressing element.

9. Valve operator assembly according to claim 7, wherein the pre-stressing element is axially located between the friction means and the casing.

10. Valve operator assembly according to claim 9, wherein the pre-stressing element is mounted in axial contact with the friction means and with the casing.

11. Valve operator assembly according to claim 7, wherein the pre-stressing element comprises mechanical actuator.

12. Valve operator assembly according to claim 1, wherein the casing comprises an inner bushing supporting the friction means and mounted in radial contact with the locking members of the freewheel, and an outer body secured onto said inner bushing.

13. Valve operator assembly according to claim 7, wherein the pre-stressing element bears axially against the outer body of the casing.

14. Valve operator assembly according to claim 1, wherein the transmission mechanism further comprises an adapter sleeve connected to the rotating element of said mechanism and onto which is mounted the input member, the locking mechanism being disposed between the adapter sleeve and the housing.

15. Valve operator assembly according to claim 1, wherein the transmission mechanism comprises a screw, a nut surrounding and coaxial with said screw, and a plurality of rolling elements radially disposed between the screw and the nut.

16. Valve comprising a valve body, a valve translating member axially moveable and a valve operator assembly for valve comprising a valve body and a valve translating member axially moveable, the assembly comprising a housing adapted to be mounted on the valve, an input member rotatably mounted with respect to said housing, and a transmission mechanism comprising a translating element adapted to be connected to the valve translating member of the valve and a rotating element connected to the input member, said transmission mechanism being adapted to convert applied rotation of the input member into axial translation of said translating element, characterized in that the assembly further comprises a locking mechanism provided with a casing mounted on the transmission mechanism and/or the housing, with at least one freewheel comprising a plurality of locking members mounted in radial contact with the transmission mechanism and with the casing, and with friction means axially disposed between said casing and the housing and mounted in axial contact with said housing, the friction means, the freewheel and the casing cooperating together to lock the transmission mechanism with the housing in a static position of said assembly.

* * * * *